(12) United States Patent
Gerardi-Fraser et al.

(10) Patent No.: US 7,683,339 B2
(45) Date of Patent: Mar. 23, 2010

(54) OPTICAL RADIATION SENSOR SYSTEM

(75) Inventors: Jennifer Gerardi-Fraser, St. Thomas (CA); Jim Fraser, St. Thomas (CA); Joel Helin, St. Thomas (CA)

(73) Assignee: Trojan Technologies (CA)

( * ) Notice: Subject to any disclaimer, the term of this patent is extended or adjusted under 35 U.S.C. 154(b) by 0 days.

(21) Appl. No.: 11/858,218

(22) Filed: Sep. 20, 2007

(65) Prior Publication Data
US 2008/0197291 A1    Aug. 21, 2008

Related U.S. Application Data

(60) Provisional application No. 60/845,754, filed on Sep. 20, 2006.

(51) Int. Cl.
*G01J 1/42* (2006.01)
(52) U.S. Cl. .................................... 250/372
(58) Field of Classification Search ............. 250/435, 250/436, 372
See application file for complete search history.

(56) References Cited

U.S. PATENT DOCUMENTS

| | | | |
|---|---|---|---|
| 5,497,004 A * | 3/1996 | Rudolph et al. ............. | 250/372 |
| 5,514,871 A | 5/1996 | Hayes et al. | |
| 5,616,823 A * | 4/1997 | Lattimore ................... | 73/1.03 |
| 6,512,234 B1 | 1/2003 | Sasges et al. | |
| 6,518,577 B1 | 2/2003 | Fang et al. | |
| 6,818,900 B2 | 11/2004 | Ellis et al. | |
| 2004/0007667 A1* | 1/2004 | Diekmann et al. .......... | 250/343 |
| 2008/0095661 A1* | 4/2008 | Kohler ....................... | 422/20 |

OTHER PUBLICATIONS

International Search Report for International Application PCT/CA2007/001673, published Mar. 27, 2008.

* cited by examiner

*Primary Examiner*—David P Porta
*Assistant Examiner*—Kiho Kim
(74) *Attorney, Agent, or Firm*—Katten Muchin Rosenman LLP

(57) ABSTRACT

An optical radiation sensor system having: a housing having a distal portion for receiving radiation from the radiation source and a proximal portion; a sensor element in communication with the proximal portion, the sensor element configured to detect and respond to incident radiation received from the radiation source; and motive structure configured to move the housing with respect to the sensor element between at least a first position and a second position. A radiation pathway is defined between the radiation source and the sensor element when the housing is in at least one of the first position and the second position. Movement of the housing with respect to the sensor element causes a modification of intensity of radiation impinging on the sensor element.

48 Claims, 7 Drawing Sheets

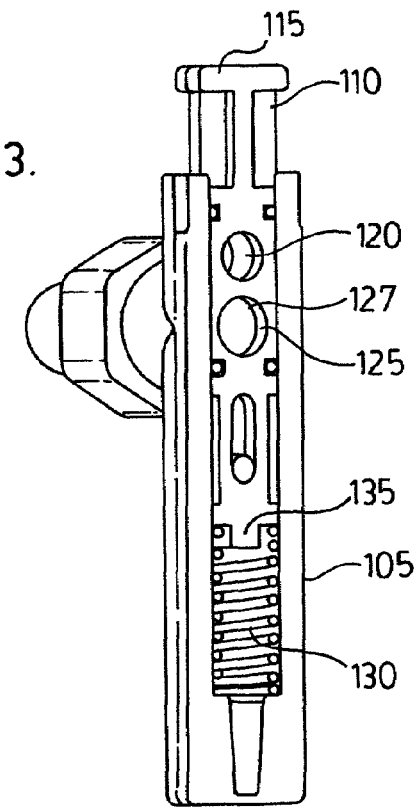
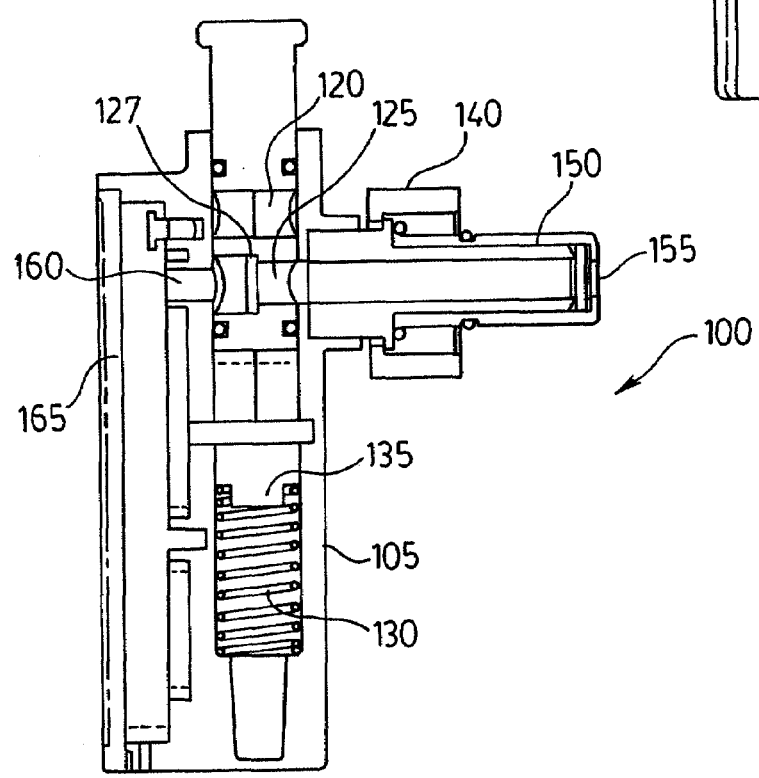

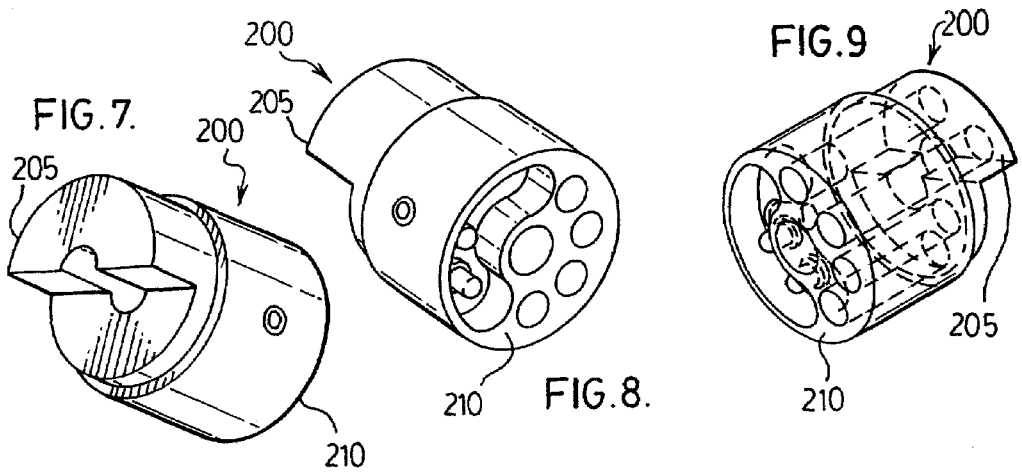
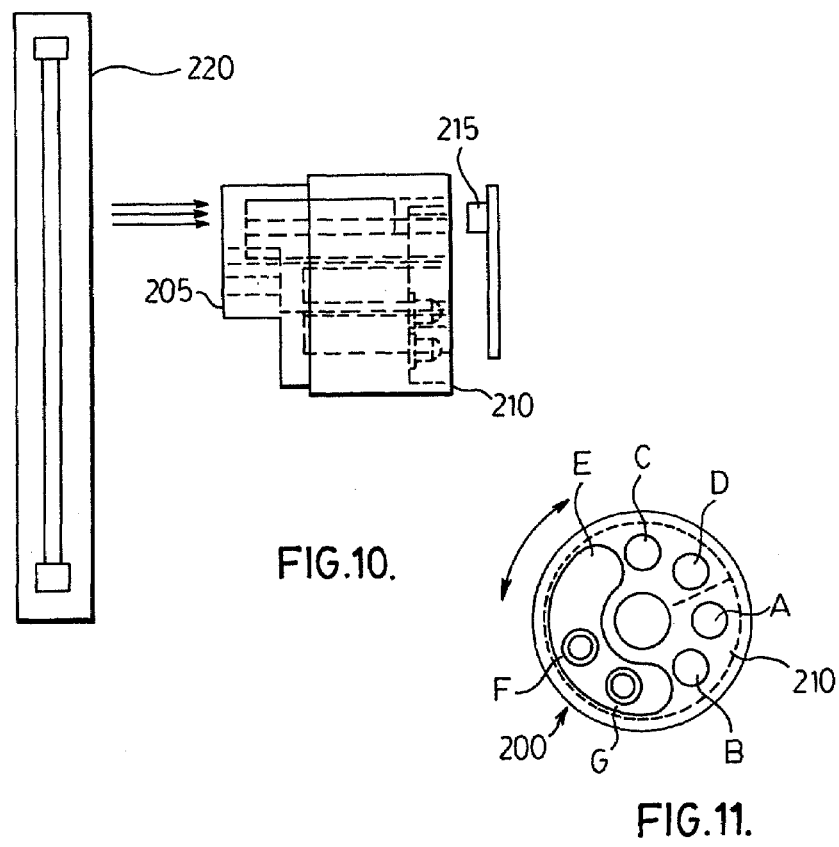

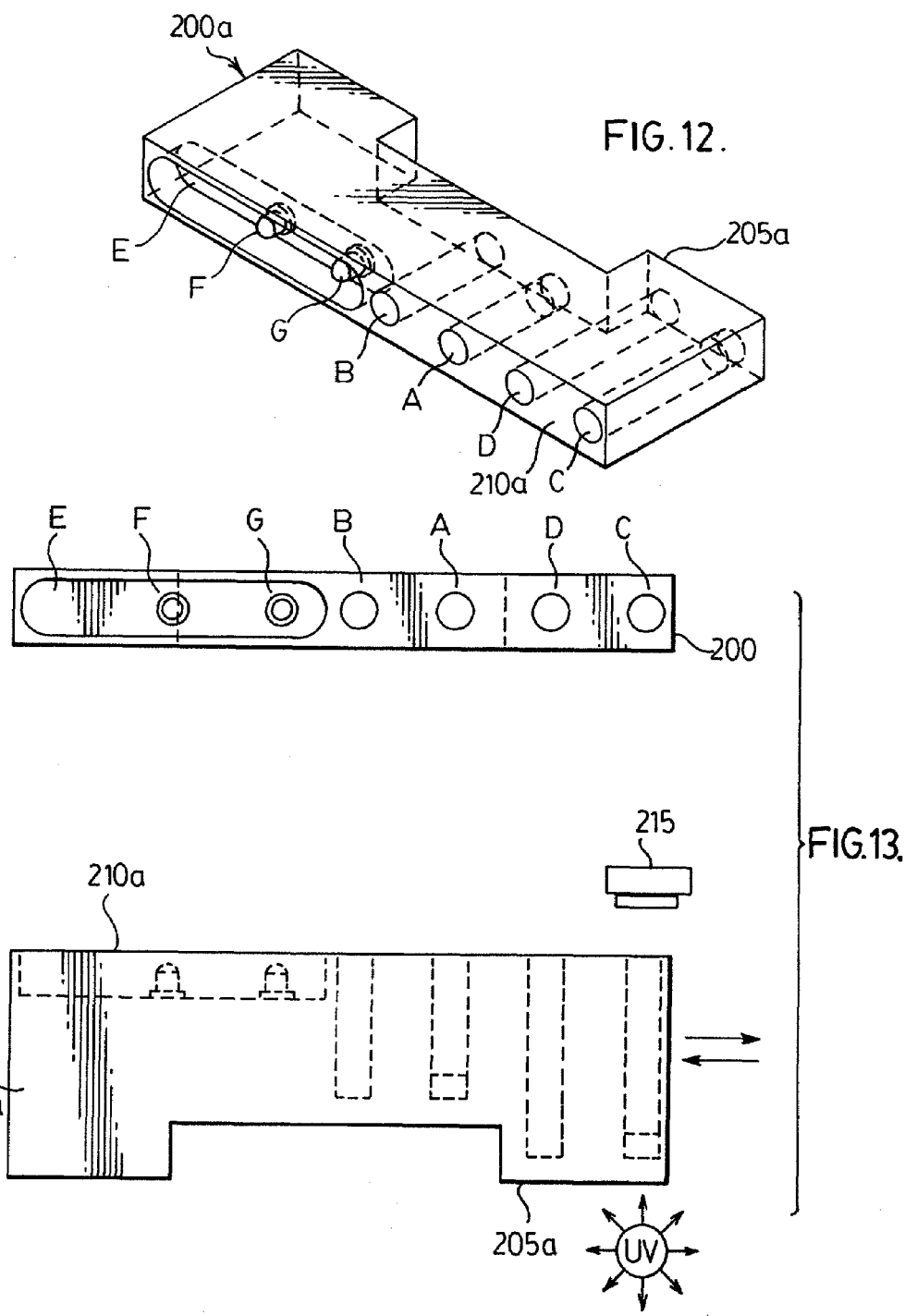

OPTICAL RADIATION SENSOR SYSTEM

CROSS-REFERENCE TO RELATED APPLICATION

The present application claims the benefit under 35 U.S.C. §119(e) of provisional patent application Ser. No. 60/845,754, filed Sep. 20, 2006, the contents of which are hereby incorporated by reference.

BACKGROUND OF THE INVENTION

1. Field of the Invention

Generally, the present invention relates to an optical radiation sensor system.

2. Description of the Prior Art

Optical radiation sensors are known and find widespread use in a number of applications. One of the principal applications of optical radiation sensors is in the field of ultraviolet radiation fluid disinfection systems.

It is known that the irradiation of water with ultraviolet light will disinfect the water by inactivation of microorganisms in the water, provided the irradiance and exposure duration are above a minimum "dose" level (often measured in units of microwatt seconds per square centimetre). Ultraviolet water disinfection units such as those commercially available from Trojan Technologies Inc. under the tradenames Trojan UV Max, Trojan UV Swift and UV8000, employ this principle to disinfect water for human consumption. Generally, water to be disinfected passes through a pressurized stainless steel cylinder which is flooded with ultraviolet radiation.

Large scale municipal waste water treatment equipment such as that commercially available from Trojan Technologies Inc. under the trade-names UV3000 and UV4000, employ the same principal to disinfect waste water. Generally, the practical applications of these treatment systems relates to submersion of treatment module or system in an open channel wherein the wastewater is exposed to radiation as it flows past the lamps. For further discussion of fluid disinfection systems employing ultraviolet radiation, see any one of the following:

U.S. Pat. No. 4,482,809 [Maarschalkerweerd],
U.S. Pat. No. 4,872,980 [Maarschalkerweerd],
U.S. Pat. No. 5,006,244 [Maarschalkerweerd],
U.S. Pat. No. 5,418,370 [Maarschalkerweerd],
U.S. Pat. No. 5,539,210 [Maarschalkerweerd],
U.S. Pat. No. 5,590,390 (Re. 36,896) [Maarschalkerweerd],
U.S. Pat. No. 7,045,102 [Fraser et al.], and
U.S. patent application Ser. No. 11/078,706 [From et al.].

In many applications, it is desirable to monitor the level of ultraviolet radiation present within the water under treatment. In this way, it is possible to assess, on a continuous or semi-continuous basis, the level of ultraviolet radiation, and thus the overall effectiveness and efficiency of the disinfection process. The information so-obtained may be used to control lamp output to a desired level.

It is known in the art to monitor the ultraviolet radiation level by deploying one or more sensor devices near the operating lamps in specific locations and orientations which are remote from the operating lamps. These sensor devices may be photodiodes, photoresistors or other devices that respond to the impingement of the particular radiation wavelength or range of radiation wavelengths of interest by producing a repeatable signal level (e.g., in volts or amperes) on output leads.

In most commercial ultraviolet water disinfection systems, the single largest operating cost relates to the cost of electricity to power the ultraviolet radiation lamps. In a case where the transmittance of the fluid varies from time to time, it would be very desirable to have a convenient means by which fluid transmittance could be measured for the fluid being treated by the system (or the fluid being otherwise investigated) at a given time. Indeed, the measurement of fluid transmittance is a requirement of the United States E.P.A. for municipal drinking water systems. If it is found that fluid transmittance is relatively high, it might be possible to reduce power consumption in the lamps by reducing the output thereof. In this way, the significant savings in power costs would be possible.

The measurement of fluid transmittance is desirable since measurement of intensity alone is not sufficient to characterize the entire radiation field—i.e., it is not possible to separate the linear effects of lamp aging and fouling from exponential effects of transmittance. Further, dose delivery is a function of the entire radiation field, since not all fluid takes the same path.

First generation optical radiation sensors, by design or orientation, normally sense the output of only one lamp, typically one lamp which is adjacent to the sensor. If it is desirable to sense the radiation output of a number of lamps, it is possible to use an optical radiation sensor for each lamp. A problem with this approach is that the use of multiple sensors introduces uncertainties since there can be no assurance that the sensors are identical. Specifically, vagaries in sensor materials can lead to vagaries in the signals which are sent by the sensors leading to a potential for false information being conveyed to the user of the system.

Another problem with such first generation optical radiation sensors is that it is not possible to ascertain the lamp output of a single lamp in an array of lamps which operate within the field of view of a single sensor.

A further problem with such first generation sensors is that, if the U.V. transmittance of the fluid being treated was unknown, two sensors would be required to determine the dose delivered to the fluid—i.e., one sensor to measure lamp intensity and one sensor to measure U.V. transmittance.

This lead to the development of second generation sensors such as the sensor described in U.S. Pat. No. 6,512,234 [Sasges et al. (Sasges)]. The Sasges optical radiation sensor device includes a radiation collector for receiving radiation from a predefined arc around the collector within the field and redirecting the received radiation along a predefined pathway; motive means to move the radiation collector from a first position in which a first portion of the predefined arc is received by the radiation collector and a second position in which a second portion of the predefined arc is received by the radiation collector; and a sensor element capable of detecting and responding to incident radiation along the pathway when the radiation collector is in the first position and in the second position.

The Sasges optical radiation sensor represents an important advance in the art in that it provides for an optical radiation sensor system which allows determination of lamp output information for a single lamp in an array of lamps. An additional advantage of the Sasges optical radiation sensor device is that a single sensor device can be used to determine the dose delivered to the fluid (i.e., in place of the multiple sensors conventionally required using first generation sensors). Thus, the provision of the Sasges optical radiation sensor device allows for on-line determination of U.V. transmittance (also known in the art as "UVT") of the fluid being treated in an ultraviolet radiation lamp array.

Another second generation sensor device is described in U.S. Pat. No. 6,818,900 [Ellis et al. (Ellis)]. In its preferred form, the Ellis sensor device altered fluid layer thickness between a radiation source and a radiation sensor by: (i) moving the radiation source while keeping the radiation sensor stationary; (ii) moving the radiation sensor while keep the radiation source stationary; or (iii) moving a boundary element interposed between a stationary radiation source and a stationary radiation sensor.

Thus, Ellis sensor device requires a single lamp and single sensor element. The sensor element and radiation source are arranged to create a fluid layer therebetween. By altering the thickness of the fluid layer, it is possible to take multiple (i.e., two or more) radiation intensity readings at multiple, known fluid layer thicknesses. Once these are achieved, using conventional calculations, it is possible to readily calculate the radiation transmittance of the fluid.

Despite the developments made to date in first and second generation sensors, there is room for improvement. Specifically, it would be desirable to have an optical radiation sensor system having one or more of the following features:

a modular design making the sensor system appropriate for use with one or more of various radiation sources, fluid thickness layers and/or UVT conditions;

built-in diagnostics for parameters such as sensor operation, radiation source output, fluid (e.g., water) UVT, radiation source fouling (e.g., fouling of the protective sleeve surrounding the radiation source) and the like;

incorporation of an integrated reference sensor;

relatively safe and ready reference sensor testing;

UVT measurement capability; and/or relatively low cost and ease of manufacture.

SUMMARY OF THE INVENTION

It is an object of the present invention to obviate or mitigate at least one of the above-mentioned disadvantages of the prior art.

It is another object of the present invention to provide a novel radiation sensor system.

Accordingly, in one of its aspects, the present invention provides an optical radiation sensor system for detecting radiation from a radiation source, the system comprising:

a housing having a distal portion for receiving radiation from the radiation source and a proximal portion;

a sensor element in communication with the proximal portion, the sensor element configured to detect and respond to incident radiation received from the radiation source; and motive means configured to move the housing with respect to the sensor element between at least a first position and a second position, a radiation pathway between the radiation source and the sensor element being defined when the housing is in at least one of the first position and the second position;

wherein movement of the housing with respect to the sensor element causes a modification of intensity of radiation impinging on the sensor element.

In another of its aspects, the present in invention provides an optical radiation sensor system for detecting radiation from a radiation source, the system comprising:

a housing having a distal portion for receiving radiation from the radiation source and a proximal portion;

a first (e.g, duty) sensor element disposed in the housing;

a second (e.g, reference) sensor element in disposed in the housing, the second sensor element configured to detect and respond to incident radiation received from the radiation source; and motive means configured to cause radiation from the radiation source to impinge only on one of the first (e.g., duty) sensor element and the second (e.g., reference) sensor element at a given point in time.

In another of its aspects, the present invention provides a fluid treatment system comprising the present optical radiation sensor system.

In another of its aspects, the present invention provides a water treatment system comprising the present optical radiation sensor system.

Thus, the present inventors have developed a radiation sensor system which, in its highly preferred embodiment, is of a modular design rendering the sensor system appropriate for use with one or more of various radiation sources, fluid thickness layers and/or in UVT conditions. In this highly preferred form, the sensor system may have built-in diagnostics for parameters such as sensor operation, radiation source output, fluid (e.g., water) UVT, radiation source fouling (e.g., fouling of the protective sleeves surrounding the radiation source) and the like. Other advantages of the present radiation sensor system include: incorporation of an integrated reference sensor, safe and ready reference sensor testing, UVT measurement capability and/or relatively low cost and ease of manufacture.

A further preferred form of the present radiation sensor system is one in which the housing of the sensor system is moved only between two positions. In one position, the radiation sensor system operates in a so-called "normal" state. In the second position, the sensor system operates in a so-called "test" state wherein the housing (or a portion thereof) is moved to alter the intensity of radiation impinging on the sensor element. Preferably, in the first position, a filter element is disposed in the pathway between the radiation source and the sensor element. In the second position wherein the user wishes to test whether the sensor element is operating properly, a lever, handle or other device is actuated and the filter element is removed from the radiation path thereby exposing the radiation element with an increased amount of radiation. The sensor system contains appropriate diagnostic circuitry to indicate to the user (e.g., via audible and/or visual means) if the sensor element is malfunctioning. In this embodiment, it is preferred to use a so-called neutral density filter whose effectiveness can be selected to obtain any signal ratio required so that a "check" signal would be detected even at very low (UVT) of the fluid being treated and with a "dirty" sensor and/or protective sleeve around the radiation source. In other words, the neutral density filter would block a significant portion (e.g., 90%) of radiation during normal operation—i.e., in the first position. This significant portion will depend, in large part, on the UVT of the fluid be treated in the fluid treatment system. Once the filter is removed from the radiation path (i.e., the housing is moved to the second position), the use can simply diagnose if the sensor element is operating properly—i.e., in the second position. Specifically, if a change in signal of radiation impinging on the sensor element is not detected in the "test" position, this would be indicative of sensor element malfunctioning.

Another advantage of the present radiation sensor system is that it facilitates incorporation of a fully integrated reference sensor. During normal operation the reference sensor normally would not be exposed to radiation since it can be disposed in a "dark zone" of the housing of the present radiation sensor system. Such protection of the reference sensor from radiation (e.g., ultraviolet radiation) when not in use will meet the United States E.P.A. guidelines criteria for reference sensors. The reference sensor checks could be done remotely, and at any time the user wishes, without: (i) impacting to the operation of the fluid treatment system, (ii) the potential of exposing the user to radiation such as UV-C, or (iii) the need to remove the safety barrier associated with having the sensor in the fluid treatment system.

If, during normal operation the standard ("duty") radiation sensor were to fail, the reference sensor could then be used to measure lamp intensity, and UVT (in the case of water treatment) until the appropriate repairs were made. The user would most likely never be without an operational sensor.

Preferably, the reference sensor (if present) is embodied in the addition of a second photodiode onto a PCB allowing it to perform reference checks (which are required under certain regulations). Whether there are 2 separate circuits or 1 circuit for both sensor elements will depend on the application. For instance, having 2 sensor elements connect to one single circuit would permit the checking of degradation of the "duty" or most used sensor element. The second or "reference" diode would be shielded from radiation to ensure that degradation of the second diode from exposure to radiation is eliminated. It is possible to have each sensor element connected to dedicated circuitry. While this would require more space on the PCB and more electrical connections to be used, the advantage is that the user may individually calibrate both sensor elements and respective circuitry. By having both sensor elements attached to one circuit, the user, in effect, would be checking the uncertainty of the sensor "detectors" itself and removing the circuitry from the uncertainty. The reference sensor is disposed on a PCB which preferably is configured to move the reference sensor to the position normally occupied by the "duty" sensor from time to time.

BRIEF DESCRIPTION OF THE DRAWINGS

Preferred embodiments of the present invention will be described with reference to the accompanying drawings, in which:

FIGS. 2-6 illustrate detailed views of the radiation sensor system shown in FIG. 1;

FIGS. 7-11 illustrate various views of an embodiment of the present radiation sensor system suitable for use with a movable block;

FIG. 12 illustrates an alternate embodiment of the block shown in FIGS. 7-11;

FIG. 13 illustrates the blocks shown in FIGS. 7-12 in a comparative fashion.

DETAILED DESCRIPTION OF THE PREFERRED EMBODIMENTS

Figure 1:
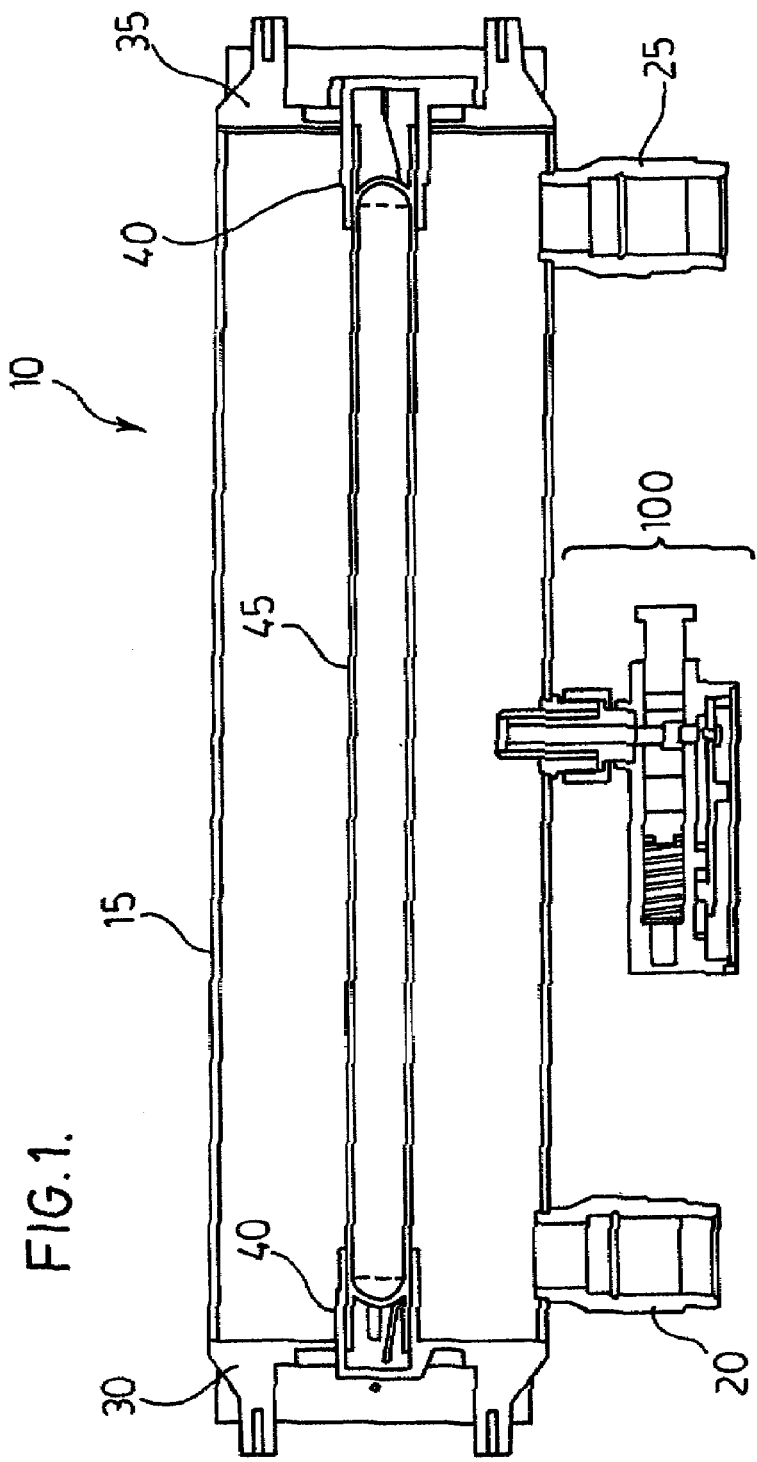
FIG. 1 illustrates a fluid treatment system incorporating an embodiment of the present optical radiation sensor system.

With reference to FIG. 1, there is illustrated a fluid treatment system 10 comprising a housing 15 having an inlet 20 and an outlet 25. Housing 15 comprises a pair of end walls 30,35. Disposed in each end wall 30,35 is a mounting sleeve 40. As illustrated, mounting sleeves 40 support opposed ends of a radiation source (preferably an ultraviolet radiation source) 45. It will be apparent that radiation source 45 is elongate and comprises a longitudinal axis. As will be understood by those of skill in the art, it is conventional to dispose radiation source 45 in a radiation transparent protective (e.g., quartz) sleeve which has been omitted from the drawings of the present application for clarity.

The description of fluid treatment system 10 up to this point is conventional. It will be recognized that fluid treatment system 10 is a so-called disposed system wherein fluid being treated is confined on all surfaces as it passes through housing 15.

Disposed in housing 15 is a first embodiment of the present radiation sensor system 100.

Figure 2:
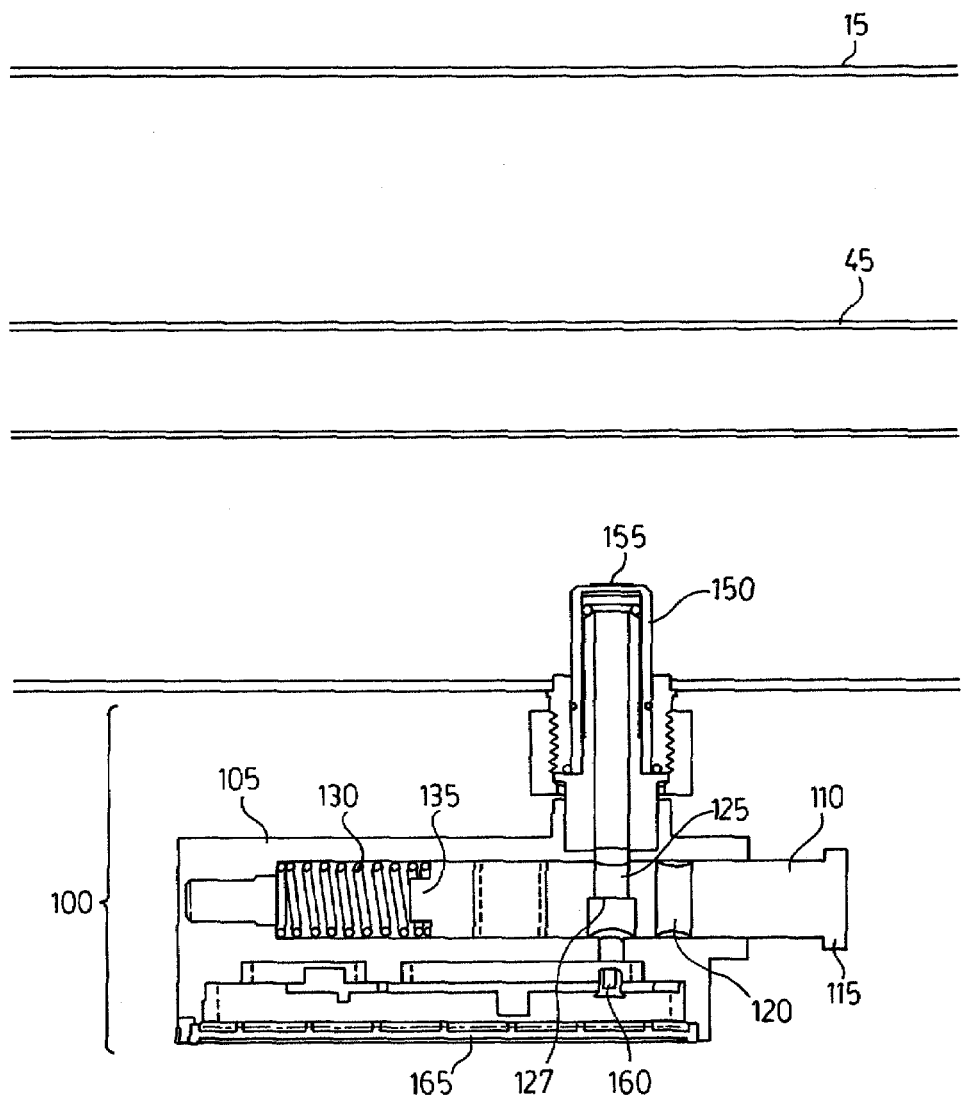

FIG. 2 illustrates an enlarged portion of fluid treatment system 10 showing mounting of radiation sensor system 100 in the wall of housing 15.

With reference to FIGS. 2-6, radiation sensor system 100 will be described in more detail.

Radiation sensor system 100 comprises a housing 105 in which is received a slidable member 110. Slidable member 110 comprises a handle portion 115 which can be gripped by a user who wishes to check whether radiation sensor system 100 is functioning properly.

Slidable member 115 comprises a first passageway 120 and a second passageway 125. First passageway 120 is open in that there is no obstruction place therein. Disposed in or in front of or at the rear of passageway 125 is a neutral density filter 127 capable of filtering at least a portion of radiation impinging thereon. Preferably, neutral density filter is constructed from a metal mesh. Alternatively, the function of the neutral density filter is conferred by using: (i) alternative thickness of a radiation transparent material such as quartz glass, (ii) a heavy metal oxide filter, or (iii) a UV transparent Teflon material.

Also disclosed in housing 105 is a spring element 130 which is adjacent an end portion 135 of slidable member 110.

Connected to housing 105 is a sub-housing 140 consisting of a series of sleeve bolts, O-rings and a cover 150 which is disposed in the fluid being treated in fluid treatment system 10. Cover 150 comprises a radiation transparent window 155 which allows radiation impinging on window 155 to pass therethrough.

A radiation sensor element 160 is disposed in housing 105 such that it is in substantial alignment with window 155 of cover 150. Sensor element 160 can be of any conventional type such as silicon, silicon carbide, diamond and the like.

FIG. 4 illustrates radiation sensor system 100 in the so-called "normal" position in which aperture 125 comprising filter element 127 is aligned with window 155 of cover 150. During operation of fluid treatment system 10, radiation emanating from radiation source 45 is received in sub-housing 140 and is filtered by filter element 127 such that only a portion of the radiation impinges on sensor element 160. Sensor element 160 is connected to a circuit board 165 which contains conventional circuitry (not shown) for sensor element 160 and is connected to one or both of an audio interface and a video interface (not shown) so as to alert the user about operation of radiation sensor system 100.

Figure 5:
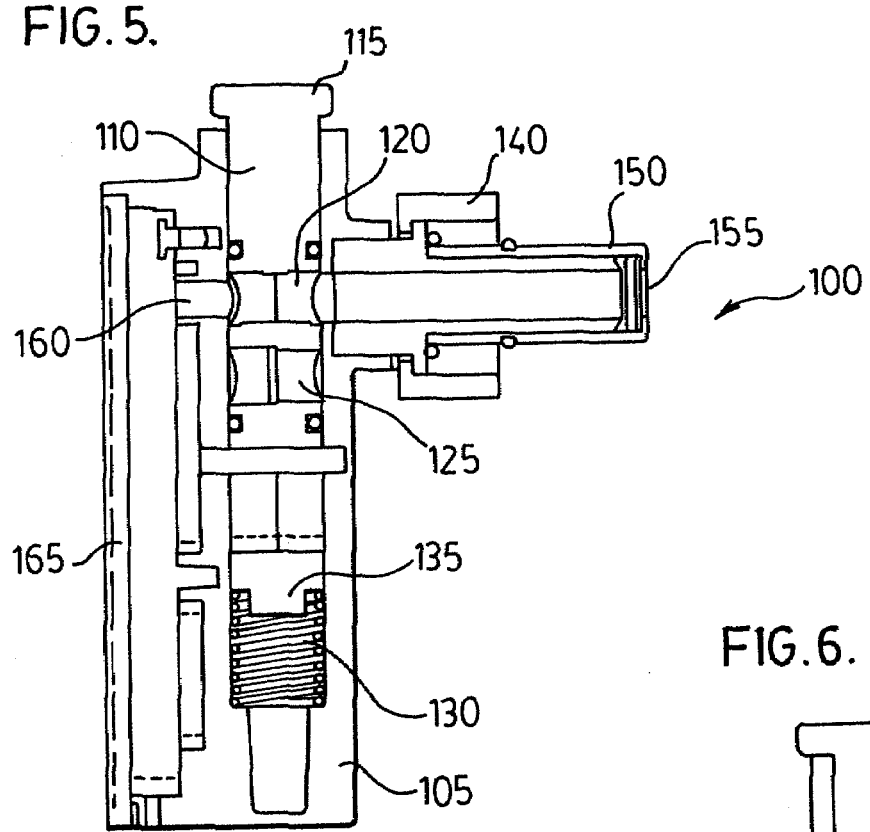
Figure 6:
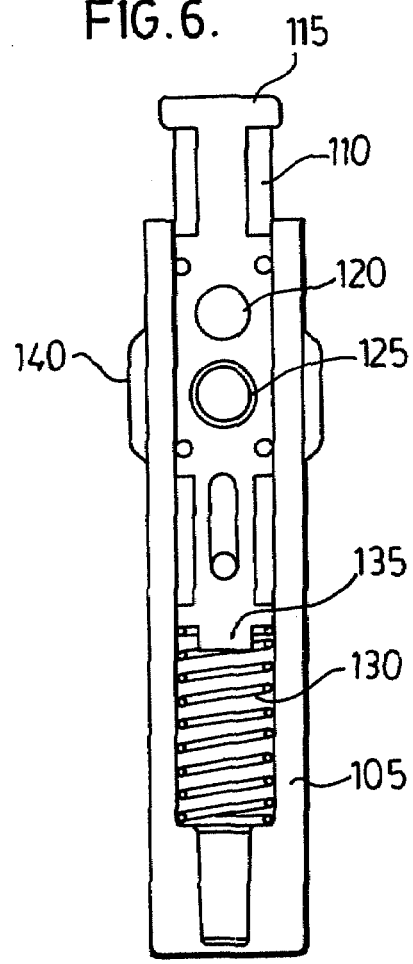

When a user wishes to test whether radiation sensor system 100 is operating properly, the user simply grips handle portion 115 and pushes slidable member 110 toward spring 130 to compress the latter—this is shown in FIG. 5. In this position, aperture 120 (containing no filter) is aligned with window 155 of cover 150 allowing a significantly increased amount of radiation to impinge on sensor element 160. Such an operation would allow the user to simply diagnose whether a loss of sensor signal is related to circuit board 165, the UVT of the fluid being treated or, after cleaning the exterior radiation source 45, related to fouling of the radiation source.

After the test is complete, the user simply releases handle 115 and slidable member 110 is biased to the so-called "normal" operating position—i.e., as shown in FIG. 4.

Thus, it will become apparent to those of skill in the art, that at least one element of housing 105 is configured to move with respect to sensor element 160 between a first position (FIG. 4) and a second position (FIG. 5). In the first position, aperture 125 (containing neutral density filter 127) is aligned with window 155 so that radiation from radiation source 45 passes through aperture 125. In the second position, aperture 120 is aligned with window 155 of cover 150 thereby allowing radiation from radiation source 45 to pass through in a relatively unobstructed manner and impinge on sensor element 160.

Radiation sensor system 100 described above is well suited for use in most radiation-based fluid treatment systems such as ultraviolet radiation water treatment system, particularly those configured for residential use in the treatment of potable water.

Radiation sensor system 100 is operable by having an element of housing 105 operable between a first position (FIG. 4) and a second position (FIG. 5) as described above. In essence, the transition from the first position to the second position involves altering the radiation pathway between radiation source 45 and sensor element 160 so as to modify the intensity of radiation impinging on sensor element 160. In the specifically illustrated embodiment, this achieved by using moving slidable member 110 to extend neutral density filter 127 out of the radiation pathway to create a radiation pathway having no such filter element.

Those of skill in the art will appreciate that such functionality can be achieved by modifying radiation sensor system 100, for example in a manner whereby slidable member 110 is configured to retract neutral density filter 127 toward the user to create a radiation pathway having no such filter element. It is also possible modify the plunger design of slidable member 110 in housing 105 to use a lift lever connected to a rotatable housing containing a pair of intersecting pathways and disposing the neutral density filter in one of the pathways (away from the intersection of the pathways).

Radiation sensor system 100 embodies the basic functionality of allowing a user to quickly and easily ascertain whether fluid treatment system 10 is operating properly (e.g., the prescribed radiation dose is being delivered by radiation source 45 to fluid passing through housing 15). This renders radiation system 100 useful in virtually all fluid treatment systems such as ultraviolet radiation water treatment systems (including those described above).

In some cases, it may desirable to add one or more radiation pathways to the radiation sensor system wherein each such radiation pathway provides an additional functionality to the radiation sensor system. For example it is possible to configure the radiation sensor system to include a block that is moveable between a number of positions equivalent to the number of radiation pathways. In practice, a single pathway would exist between the radiation source (or sources) and the sensor element. The intensity of radiation impinging on the radiation sensor would be modified by moving the block thereby moving various elements in or out of the pathway. The block may be moved by translation (slidable), rotation or any other convenient means.

For example, it is possible to configure the movable block to have two or more block pathways (each pathway is configured to function in the following manner and/or include elements to achieve the stated functionality):

Pathway (A): the distal portion of the block is configured to be positioned at a first distance from the radiation source and comprises a first filter element interposed between the distal portion and the sensor element, the first filter element configured to filter prescribed radiation wavelengths (e.g., the neutral density filter described above);

Pathway (B): the distal portion of the block is configured to be positioned at a first distance from the radiation source and does not contain the first filter element in block Pathway (A);

Pathway (C): the distal portion of the block is configured to be positioned at a second distance from the radiation source and comprises a second filter element interposed between the distal portion and the sensor element, the second filter element configured to filter a prescribed radiation wavelength (e.g., the neutral density filter described above), the second distance being less that the first distance in Pathway (A);

Pathway (D): the distal portion of the block is configured to be positioned at the second distance from the radiation source and does not contain the second filter element in block Pathway (C);

Pathway (E): a radiation opaque element is interposed between the distal portion of the block and the sensor element, the radiation opaque element configured to prevent substantially all radiation from the radiation source from impinging on the sensor element;

Pathway (F): a radiation opaque element is interposed between the distal portion of the block and the sensor element, the radiation opaque element being configured to prevent substantially all radiation from the radiation source from impinging on the sensor element; and a first supplementary radiation source is interposed between the radiation opaque element, the supplementary radiation source being configured to emit radiation at an intensity that exceeds the detection limit of the sensor element;

Pathway (G): a radiation opaque element is interposed between the distal portion of the block and the sensor element, the radiation opaque element being configured to prevent substantially all radiation from the radiation source from impinging on the sensor element; and a second supplementary radiation source is interposed between the radiation opaque element, the supplementary radiation source being configured to emit radiation at a prescribed intensity below a pre-determined detection limit of the sensor element.

Preferably, the distal portion of the block in Pathway (E) is positioned at the first distance from the radiation source.

Preferably, the distal portion of the block in Pathway (F) is positioned at the first distance from the radiation source.

Preferably, the distal portion of the block in Pathway (G) is positioned at the first distance from the radiation source.

Preferably, the distal portion of the block in Pathway (E) is positioned at the second distance from the radiation source.

Preferably, the distal portion of the block in Pathway (F) is positioned at the second distance from the radiation source.

Preferably, the distal portion of the block in Pathway (G) is positioned at the second distance from the radiation source.

Those of skill in the art will recognize that the precise position of the distal portion of the block in Pathways (E), (F) and (G) with respect to the radiation source is not particularly restricted since each of these Pathways contains a radiation opaque element.

In a first preferred embodiment the block comprises at least one of Pathways (A) and (B), more preferably at least each of Pathways (A) and (B). Such an arrangement provides the same functionality as radiation sensor system 100 described above. The arrangement is well suited for use with a radiation sensor system in a water treatment system which is treating water over a relatively narrow UVT range (e.g, drinking or potable water).

In a second preferred embodiment, the block comprises at least one of Pathways (C) and (D), preferably each of Pathways (C) and (D). Such an arrangement provides the same functionality as radiation sensor system 100 described above. Since the distal portion of the block in Pathways (C) and (D) is at lesser distance to the radiation source than that of Pathways (A) and (B), Pathways (C) and (D) provide the additional advantage of being able to use the radiation sensor system in water treatment system which is treating water over a relatively broad UVT range (e.g., municipal waste water).

In a third preferred embodiment, the block comprises at least Pathways (A) and (C) or at least Pathways (B) and (D), preferably each of Pathways (A), (B), (C) and (D). This preferred embodiment embodies the functionality of allowing the user to measure the UVT of the water being treated (e.g, in an on-line manner) by obtaining multiple radiation intensity readings at multiple water layer thickness—see, for example, U.S. Pat. No. 6,512,234 for additional information on how to convert so-obtained multiple radiation intensity readings to UVT. In this embodiment, a comparison of radiation intensity readings using Pathways (A) and (C) may be used when treating relatively high UVT water (e.g. drinking or potable water) and a comparison of radiation intensity readings using Pathways (B) and (D) may be used when treating relatively low UVT water (e.g, municipal waste water).

In a fourth preferred embodiment, the block comprises the first, second or third preferred embodiments just described, together with at least one of Pathways (E), (F) and (G), more preferably together with at least two of Pathways (E), (F) and (G), even more preferably together with each of Pathways (E), (F) and (G).

Pathway (E) is a so-called "dark zone" in which the sensor element may be placed for a 4 ma (i.e., nil) signal check.

Preferably, the first supplementary radiation source in Pathway (F) is a light emitting diode such as a UV-C light emitting diode. In essence this pathway is similar to Pathway (E) with the addition of a UV-C light emitting diode (preferred embodiment) in a portion of the dark zone providing for the ability to conduct a saturation signal check on the sensor element. An advantage of Pathway (F) is that it allows for removal of the sensor element from the fluid treatment system from the sensor check.

Preferably, the second supplementary radiation source in Pathway (G) is a light emitting diode such as a UV-C light emitting diode. Since Pathway (F) represents a dark zone for the sensor element, a second (or the same) pathway with output from a calibrated UV-C light emitting diode (preferred embodiment) could be used to check one set point on the operational curve of the sensor. For example: if at the time of calibration, the set point light emitting diode were known to generate a signal of 11 mA in the sensor element, sensor operation could be compared to this value at any time during system operation which would then help determine whether the radiation sensor system was working within expected parameters. This is especially advantageous as it is a pure check of the performance of the sensor electronics in that the additional variables of tolerance stack up, lamp output variability, quartz sleeve and fouling are removed.

FIGS. 7-11 illustrate various views of an embodiment of the present radiation sensor system suitable for use with a block 200 having a distal end 205 and a proximal end 210. Block 200 is connected to a motor (not shown) or other motive means that rotates with respect to a sensor element 215 and a radiation source 220 to alter the intensity of radiation impinging on sensor element 215 in the manner described above. It is possible of course to eliminate the motor such that block 200 is rotated manually. The letters A, B, C, D, E, F and G have been used to denote the Pathways described above.

FIG. 12 illustrates an alternative embodiment in which the same functionality is achieved with a block 200a have a distal end 205a and proximal end 210a. Block 200a is connected to a motor (not shown) or other motive means that translates block 200a with respect to sensor element 215 and radiation source 220. While the means of moving the reference sensor (if present) is not specifically shown in the drawings, this can be readily accomplished by those of skill in the art.

FIG. 13 illustrates block 200 in an "unrolled" fashion and block 200a to show the equivalent functionality of these elements.

In FIGS. 7-13, the letters A, B, C, D, E, F and G have been used to denote the Pathways described above.

Figure 14:
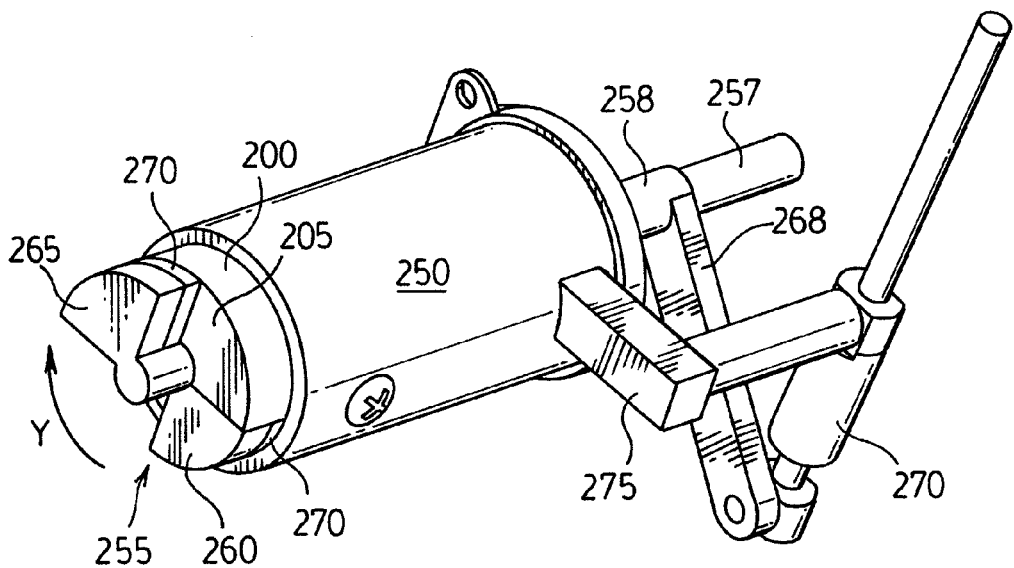
FIGS. 14-15 illustrate the block shown in FIGS. 7-11 incorporated with other elements in a preferred embodiment of the present radiation sensor system.
Figure 15:
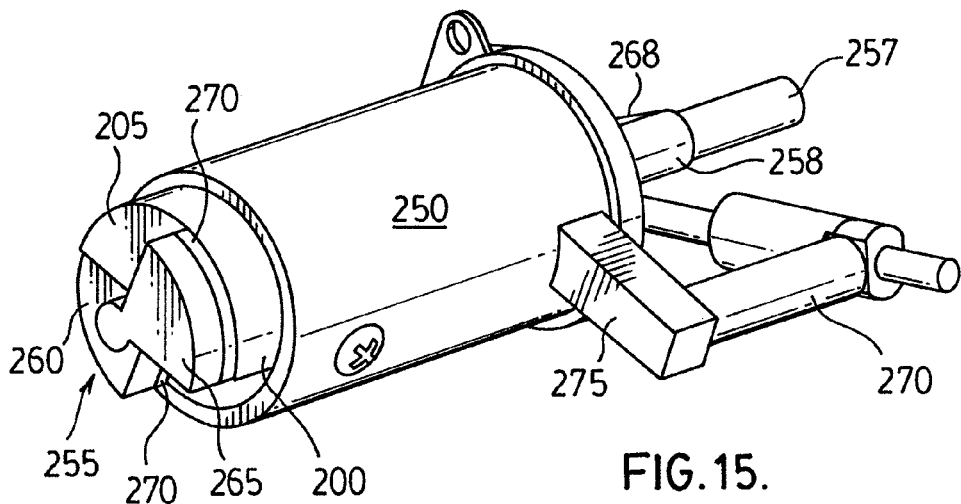

With reference to FIGS. 14 and 15, there is illustrated block 200 (FIGS. 7-11) incorporated with other elements in a preferred embodiment of the present radiation sensor system. Proximal end 210 of block 200 is disposed in a housing 250 which also contains sensor element 215 (for clarity, neither proximal end 210 nor sensor element 215 are shown in FIGS. 14 and 15).

Connected to the distal end 205 of block 200 is a cleaning system 255 consisting of cleaning chambers 260,265. A rubber (or similar) gasket 270 is interposed between cleaning chambers 260,265 and distal end 205 of block 200. Cleaning chambers 260, 265 may be filled with a suitable cleaning fluid. Cleaning system 255 further comprises a conduit 257 for supply cleaning fluid to each of cleaning chambers 260, 265.

Cleaning system 255 is connected to an axle 258 which in turn is connected a linear solenoid 270 via an arm 268. Housing 250 is connected to linear solenoid 270 via a mount 275.

When it is desired to clean the distal end 205 of block 200, solenoid 270 is actuated and cleaning system 255 is rotated in the direct of arrow Y. Thus, cleaning system 255 essentially is operable between a first position (FIG. 14) and a second position (FIG. 15).

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. An optical radiation sensor system for detecting radiation from a radiation source, the system comprising:

a housing having a distal portion for receiving radiation from the radiation source and a proximal portion;

a sensor element in communication with the proximal portion, the sensor element configured to detect and respond to incident radiation received from the radiation source; and motive means configured to move the housing with respect to the sensor element between at least a first position and a second position, a radiation pathway between the radiation source and the sensor element being defined when the housing is in at least one of the first position and the second position;

wherein movement of the housing with respect to the sensor element causes a modification of intensity of radiation impinging on the sensor element; and wherein the housing is configured to be positioned at: (i) a first distance from radiation source in the first position, and (ii) a second distance from the radiation source in the second position, the first distance being different than the second distance.

2. The radiation sensor system defined in claim 1, wherein the first position comprises a first radiation filter element and the second position is free of the first radiation filter element present in the first position.

3. The radiation sensor system defined in claim 1, wherein a first radiation pathway from the radiation source to the sensor element is defined when the housing is in the first position.

4. The radiation sensor system defined in claim 1, wherein a second radiation pathway from the radiation source to the sensor element is defined when the housing is in the second position.

5. The radiation sensor system defined in claim 1, wherein a first radiation pathway from the radiation source to the sensor element is defined when the housing is in the first position and a second radiation pathway from the radiation source to the sensor element is defined when the housing is in the second position.

6. The radiation sensor system defined in claim 1, wherein a first radiation pathway from the radiation source to the sensor element is defined when the housing is in the first position and the housing further comprises a radiation opaque element which prevents substantially all radiation from the radiation source from impinging on the sensor element when the housing is in the second position.

7. The radiation sensor system defined in claim 6, further comprising a supplementary radiation source disposed between the radiation opaque element and the sensor element.

8. The radiation sensor system defined in claim 7, wherein the supplementary radiation source is configured to emit radiation at a pre-determined detection limit of the sensor element.

9. The radiation sensor system defined in claim 7, wherein the supplementary radiation source is configured to emit radiation at a prescribed intensity below pre-determined detection limit of the sensor element.

10. The radiation sensor system defined in claim 1, wherein the housing is configured as a block comprising a multiplicity of different block pathways between the distal portion and the proximal portion, the block being moveable with respect to the sensor element to a position corresponding to each block pathway.

11. The radiation sensor system defined in claim 10, wherein the block comprises at least two block pathways selected from the group consisting of:
(A) the distal portion being positioned at a first distance from the radiation source and comprising a first filter element interposed between the distal portion and the sensor element, the first filter element configured to filter prescribed radiation wavelengths;
(B) the distal portion being positioned at a first distance from the radiation source and being free of the first filter element in block pathway (A);
(C) the distal portion being positioned at a second distance from the radiation source and comprising a second filter element interposed between the distal portion and the sensor element, the second filter element configured to filter prescribed radiation wavelengths, the second distance being less that the first distance in pathway (A);
(D) the distal portion being positioned at the second distance from the radiation source and being free of the second filter element in block pathway (C);
(E) a radiation opaque element interposed between the distal portion of the housing and the sensor element, the radiation opaque element configured to prevent substantially all radiation from the radiation source from impinging on the sensor element;
(F) a radiation opaque element interposed between the distal portion of the housing and the sensor element, the radiation opaque element being configured to prevent substantially all radiation from the radiation source from impinging on the sensor element; and a first supplementary radiation source interposed between the radiation opaque element, the supplementary radiation source being configured to emit radiation at an intensity that exceeds the detection limit of the sensor element;
(G) a radiation opaque element interposed between the distal portion of the housing and the sensor element, the radiation opaque element being configured to prevent substantially all radiation from the radiation source from impinging on the sensor element; and a second supplementary radiation source interposed between the radiation opaque element, the supplementary radiation source being configured to emit radiation at a prescribed intensity below a predetermined detection limit of the sensor element.

12. The radiation sensor system defined in claim 11, wherein the distal portion of the housing in pathway (E) is positioned at the first distance from the radiation source.

13. The radiation sensor system defined in claim 11, wherein the distal portion of the housing in pathway (F) is positioned at the first distance from the radiation source.

14. The radiation sensor system defined in claim 11, wherein the distal portion of the housing in pathway (G) is positioned at the first distance from the radiation source.

15. The radiation sensor system defined in claim 11, wherein the distal portion of the housing in pathway (E) is positioned at the second distance from the radiation source.

16. The radiation sensor system defined in claim 11, wherein the distal portion of the housing in pathway (F) is positioned at the second distance from the radiation source.

17. The radiation sensor system defined in claim 11, wherein the distal portion of the housing in pathway (G) is positioned at the second distance from the radiation source.

18. The radiation sensor system defined in claim 11, wherein the first supplementary radiation source is a first light emitting diode.

19. The radiation sensor system defined in claim 11, wherein the second supplementary radiation source is a second light emitting diode.

20. The radiation sensor system defined in claim 11, wherein the first supplementary radiation source is a first light emitting diode and the second supplementary radiation source is a second light emitting diode.

21. The radiation sensor system defined in claim 11, wherein the block comprises at least one of pathways (A) and (B).

22. The radiation sensor system defined in claim 21, wherein the block further comprises at least two of pathways (E), (F) and (G).

23. The radiation sensor system defined in claim 21, wherein the block further comprises each of pathways (E), (F) and (G).

24. The radiation sensor system defined in claim 11, wherein the block comprises at least each of pathways (A) and (B).

25. The radiation sensor system defined in claim 11, wherein the block comprises at least one of pathways (C) and (D).

26. The radiation sensor system defined in claim 11, wherein the block comprises at least each of pathways (C) and (D).

27. The radiation sensor system defined in claim 11, wherein the block comprises at least one of pathways (A) and (C).

28. The radiation sensor system defined in claim 11, wherein the block comprises at least each of pathways (B) and (D).

29. The radiation sensor system defined in claim 21, wherein the block further comprises at least one of pathways (E), (F) and (G).

30. The radiation sensor system defined in claim 11, wherein the block comprises each of pathways (A), (B), (C), (D), (E), (F) and (G).

31. An optical radiation sensor system for detecting radiation from a radiation source, the system comprising:
   a housing having a distal portion for receiving radiation from the radiation source and a proximal portion;
   a sensor element in communication with the proximal portion, the sensor element configured to detect and respond to incident radiation received from the radiation source; and
   motive means configured to move the housing with respect to the sensor element between at least a first position and a second position, a radiation pathway between the radiation source and the sensor element being defined when the housing is in at least one of the first position and the second position;
   wherein: (i) the housing is configured as a block comprising a multiplicity of different block pathways between the distal portion and the proximal portion, the block being moveable with respect to the sensor element to a position corresponding to each block pathway to cause a modification of intensity of radiation impinging on the sensor element; and (ii) wherein the block comprises at least two block pathways selected from the following pathways (A) and (B), in combination with at least one block pathway selected from the following pathways (B), (F) and (G), where:
   (A) the distal portion being positioned at a first distance from the radiation source and comprising a first filter element interposed between the distal portion and the sensor element, the first filter element configured to filter prescribed radiation wavelengths;
   (B) the distal portion being positioned at a first distance from the radiation source and being free of the first filter element in block pathway (A);
   (C) the distal portion being positioned at a second distance from the radiation source and comprising a second filter element interposed between the distal portion and the sensor element, the second filter element configured to filter prescribed radiation wavelengths, the second distance being less that the first distance in pathway (A);
   (D) the distal portion being positioned at the second distance from the radiation source and being free of the second filter element in block pathway (C);
   (E) a radiation opaque element interposed between the distal portion of the housing and the sensor element, the radiation opaque element configured to prevent substantially all radiation from the radiation source from impinging on the sensor element;
   (F) a radiation opaque element interposed between the distal portion of the housing and the sensor element, the radiation opaque element being configured to prevent substantially all radiation from the radiation source from impinging on the sensor element; and a first supplementary radiation source interposed between the radiation opaque element, the supplementary radiation source being configured to emit radiation at an intensity that exceeds the detection limit of the sensor element;
   (G) a radiation opaque element interposed between the distal portion of the housing and the sensor element, the radiation opaque element being configured to prevent substantially all radiation from the radiation source from impinging on the sensor element; and a second supplementary radiation source interposed between the radiation opaque element, the supplementary radiation source being configured to emit radiation at a prescribed intensity below a predetermined detection limit of the sensor element.

32. The radiation sensor system defined in claim 31, wherein the distal portion of the housing in pathway (E) is positioned at the first distance from the radiation source.

33. The radiation sensor system defined in claim 31, wherein the distal portion of the housing in pathway (F) is positioned at the first distance from the radiation source.

34. The radiation sensor system defined in claim 31, wherein the distal portion of the housing in pathway (G) is positioned at the first distance from the radiation source.

35. The radiation sensor system defined in claim 31, wherein the distal portion of the housing in pathway (E) is positioned at the second distance from the radiation source.

36. The radiation sensor system defined in claim 31, wherein the distal portion of the housing in pathway (F) is positioned at the second distance from the radiation source.

37. The radiation sensor system defined in claim 31, wherein the distal portion of the housing in pathway (G) is positioned at the second distance from the radiation source.

38. The radiation sensor system defined in claim 31, wherein the first supplementary radiation source is a first light emitting diode.

39. The radiation sensor system defined in claim 31, wherein the second supplementary radiation source is a second light emitting diode.

40. The radiation sensor system defined in claim 31, wherein the first supplementary radiation source is a first light emitting diode and the second supplementary radiation source is a second light emitting diode.

41. The radiation sensor system defined in claim 31, wherein the block comprises each of pathways (A) and (B).

42. The radiation sensor system defined in claim 31, wherein the block further comprises at least one of pathways (C) and (D).

43. The radiation sensor system defined in claim 31, wherein the block further comprises each of pathways (C) and (D).

44. The radiation sensor system defined in claim 31, wherein the block comprises one of pathways (A) and (C).

45. The radiation sensor system defined in claim 31, wherein the block comprises each of pathways (B) and (D).

46. The radiation sensor system defined in claim 31, wherein the block comprises at least two of pathways (E), (F) and (G).

47. The radiation sensor system defined in claim 31, wherein the block comprises each of pathways (E), (F) and (G).

48. The radiation sensor system defined in claim 31, wherein the block comprises each of pathways (A), (B), (C), (D), (E), (F) and (G).

* * * * *